US010373772B2

(12) United States Patent
Kari et al.

(10) Patent No.: US 10,373,772 B2
(45) Date of Patent: Aug. 6, 2019

(54) LIGHT SWITCH HOOK ASSEMBLY

(71) Applicant: Borrowed Card, LLC, Canton, OH (US)

(72) Inventors: Atalla H. Kari, Canton, OH (US); James C. Shaheen, Massillon, OH (US)

(73) Assignee: Borrowed Card, LLC, Canton, OH (US)

( * ) Notice: Subject to any disclaimer, the term of this patent is extended or adjusted under 35 U.S.C. 154(b) by 0 days.

(21) Appl. No.: 16/016,033

(22) Filed: Jun. 22, 2018

(65) Prior Publication Data

US 2019/0006132 A1 Jan. 3, 2019

Related U.S. Application Data

(60) Provisional application No. 62/526,633, filed on Jun. 29, 2017.

(51) Int. Cl.
| | |
|---|---|
| *H01H 3/04* | (2006.01) |
| *H01H 9/02* | (2006.01) |
| *A47G 29/10* | (2006.01) |
| *F16B 45/00* | (2006.01) |
| *H02G 3/08* | (2006.01) |

(52) U.S. Cl.
CPC .............. *H01H 9/02* (2013.01); *A47G 29/10* (2013.01); *F16B 45/00* (2013.01); *H02G 3/08* (2013.01); *H01H 3/04* (2013.01); *H01H 2223/024* (2013.01); *H01H 2223/058* (2013.01); *H01H 2231/012* (2013.01)

(58) Field of Classification Search
CPC ...... H01H 9/02; H01H 3/04; H01H 2223/024; H01H 2223/058; H01H 2231/012; A47G 29/10; F16B 45/00
See application file for complete search history.

(56) References Cited

U.S. PATENT DOCUMENTS

| | | | | |
|---|---|---|---|---|
| 3,113,996 A | * | 12/1963 | Sanford ................. | H01R 13/60 174/67 |
| 6,130,384 A | * | 10/2000 | Esteves .............. | A47G 25/0607 174/66 |
| 9,022,336 B2 | * | 5/2015 | Huynh ..................... | H02G 3/14 174/66 |
| 9,583,927 B2 | * | 2/2017 | Allen ..................... | H02G 3/081 |

* cited by examiner

*Primary Examiner* — Anita M King
(74) *Attorney, Agent, or Firm* — Sand, Sebolt & Wernow Co., LPA

(57) ABSTRACT

A light switch hook assembly including a light switch plate and a hook extending outwardly therefrom. A fastener is inserted through an aperture defined in the hook and then into a hole defined in the light switch plate. The end of the fastener is subsequently inserted into an opening defined in a light switch mounted within an electrical connector box. The light switch plate may already be installed on a wall. In this instance, a fastener is removed from this pre-existing light switch plate, the hook is positioned against the plate, and the fastener is inserted through the aperture in the hook, through the hole from which the fastener was previously removed, and into the opening in the light switch. A cover may be engaged with the hook to cover the head of the fastener. An article may be hung on the hook.

18 Claims, 14 Drawing Sheets

LIGHT SWITCH HOOK ASSEMBLY

CROSS-REFERENCE TO RELATED APPLICATIONS

This application claims the benefit of U.S. Provisional Patent Application Ser. No. 62/526,633 filed Jun. 29, 2017, the entire disclosure of which is incorporated herein by reference.

BACKGROUND

Technical Field

Generally, the current disclosure relates to components for hanging an article on a vertical surface. More particularly, the current disclosure relates to a hook for hanging an article on a wall. Specifically, the current disclosure is directed to a hook provided on a light switch plate where the hook is secured to the light-switch plate using a same fastener that would typically secure the light switch plate to an electrical box mounted in the wall. A cover may be provided on the hook to hide the head of the fastener.

Background Information

A hook may be mounted on a wall or any other vertical surface to hang articles such as a picture or a set of keys. Some prior art hooks are secured directly to a vertical surface using a nail, a screw, or another other type of fastener that punctures the wall or surface during installation. These fasteners may be integral with the hook or may be selectively engageable through an aperture defined in the hook. Using these nails, screws or other fasteners may cause damage to the wall or surface and this damage may later have to be repaired.

Other prior art hooks include those that utilize an adhesive strip to secure the hook to the wall or vertical surface. While these prior art hooks do not puncture the wall or vertical surface, they may leave an adhesive or chemical residue on the wall or surface once the hook is detached therefrom. This residue may prove difficult to remove and may affect paint or other finishes that are later applied over the wall or surface.

SUMMARY

There is therefore a need in the art for an improved hook for hanging an article that does not tend to damage a wall or a surface by puncturing the same in order to install the hook or which will tend to leave an adhesive or chemical residue on the wall or surface.

The current disclosure relates to a light switch hook assembly that includes a hook for hanging articles thereon. The hook extends outwardly from a light switch plate so that an item may be hung on the hook for easy access as a person enters a room or leaves a room.

The light switch plate may be a pre-existing light switch plate that is modified by attaching a hook thereto using a fastener that was previously being utilized to secure the light switch plate to a light switch mounted within an electrical connection box that is mounted within a building wall. In other examples, the light switch hook assembly may be provided as a kit that includes a new light switch plate and a hook. This kit may be installed to replace a previously existing light switch. The kit may be secured to a pre-existing light switch mounted within an electrical connection box or to a new light switch. In yet other instances, the hook may be molded as part of the light switch plate to form a unitary, monolithic component. In this example, a fastener may be inserted through a portion of the light switch plate alone or a portion of the hook and the light switch plate and the end of the fastener may be threadably engaged in an opening defined in a light switch mounted within an electrical connection box mounted in the wall.

The hook may have a portion, particularly an upper portion that defines an aperture therein. The hook may be secured to the light switch plate using a fastener that will also be utilized to secure the light switch plate to an electrical box in such a way that the plate is sandwiched between the hook and a light switch mounted in the electrical box. In the case of a pre-existing light switch plate, the fastener that secures that pre-existing light switch plate may be disengaged from the electrical box, the hook's aperture may be aligned with an aperture in the pre-existing light switch plate, and then the fastener is passed through the aligned apertures and back into engagement with the light switch or electrical box. In some examples, a cover may be placed so as to extend over the head of the fastener to hide the same. An article may be hung on the hook extending outwardly from the light switch plate.

Furthermore, the hook may be located on a light switch plate adjacent an exit of a building or apartment to provide a convenient location to hang an item, such as a set of keys. The location may aid in reminding a person to take that item with them as they exit the building or room.

In one aspect, the current disclosure may provide a light switch hook assembly comprising a light switch plate having a front surface and a rear surface, said light switch plate being adapted to be secured to a light switch; a hook extending outwardly from the front surface of the plate; and a fastener that extends through an aperture defined in one of the hook and the light switch plate, wherein said fastener is adapted to be engaged with the light switch. The aperture may be defined in the hook and a hole may be defined in the light switch plate; and a shaft of the fastener may be inserted through the aperture and the hole when aligned with each other.

In another aspect, the present disclosure may provide a light switch hook assembly comprising a light switch plate having a front surface and a rear surface, said light switch plate being adapted to be secured to a light switch, wherein the light switch defines a hole therein that extends from the front surface to the rear surface; a hook having an upper portion, said upper portion defining an aperture therethrough; and a fastener that extends through the aperture through the hole and engages the hook with the light switch plate.

In another aspect, the current disclosure may provide a method of hanging an article on a wall comprising steps of providing a light switch plate having a hole defined therein, wherein the hole extends between a front surface and a back surface of the light switch plate; placing a rear surface of a hook against the front surface of the light switch plate; aligning an aperture defined in the hook with the hole defined in the light switch plate; inserting a shaft of a fastener through the aligned aperture and hole; inserting the shaft of the fastener into an opening defined in a light switch mounted in an electrical box; rotating the fastener until the light switch plate and hook are secured to the light switch; and engaging an article on the hook. The method may further comprise seating a head of the fastener in a recessed region of the hook; and covering the recessed region with a cover. The step of covering includes placing the cover into a first region of the aperture defined in the hook. In other examples, the step of cover includes snap-fitting the cover over a part of the hook that includes the aperture. The step of aligning the aperture with the hole is preceded by a step of disengaging a cover from the hook. The step of disengaging the cover is accomplished by inserting an end of a tool into a recess defined in a perimeter of the aperture or in a perimeter of the cover and applying a force to the cover with the end of the tool.

In yet another aspect, the current disclosure may provide a method of mounting a hook on a vertical surface comprising steps of unscrewing a fastener from a light switch plate installed the vertical surface; removing the fastener from a hole defined in the light switch plate; providing a hook having an aperture defined therein; placing the hook against the light switch plate; aligning the aperture with the hole; inserting the fastener through the aligned aperture and hole; and securing the hook to the light switch plate. The method may further comprise inserting an end of the fastener into an opening defined in a light switch mounted in an electric connection box; and sandwiching the light switch plate between the hook and the light switch. The method may further comprise engaging a cover with the hook; and covering a head of the fastener with the cover.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Figure 1:
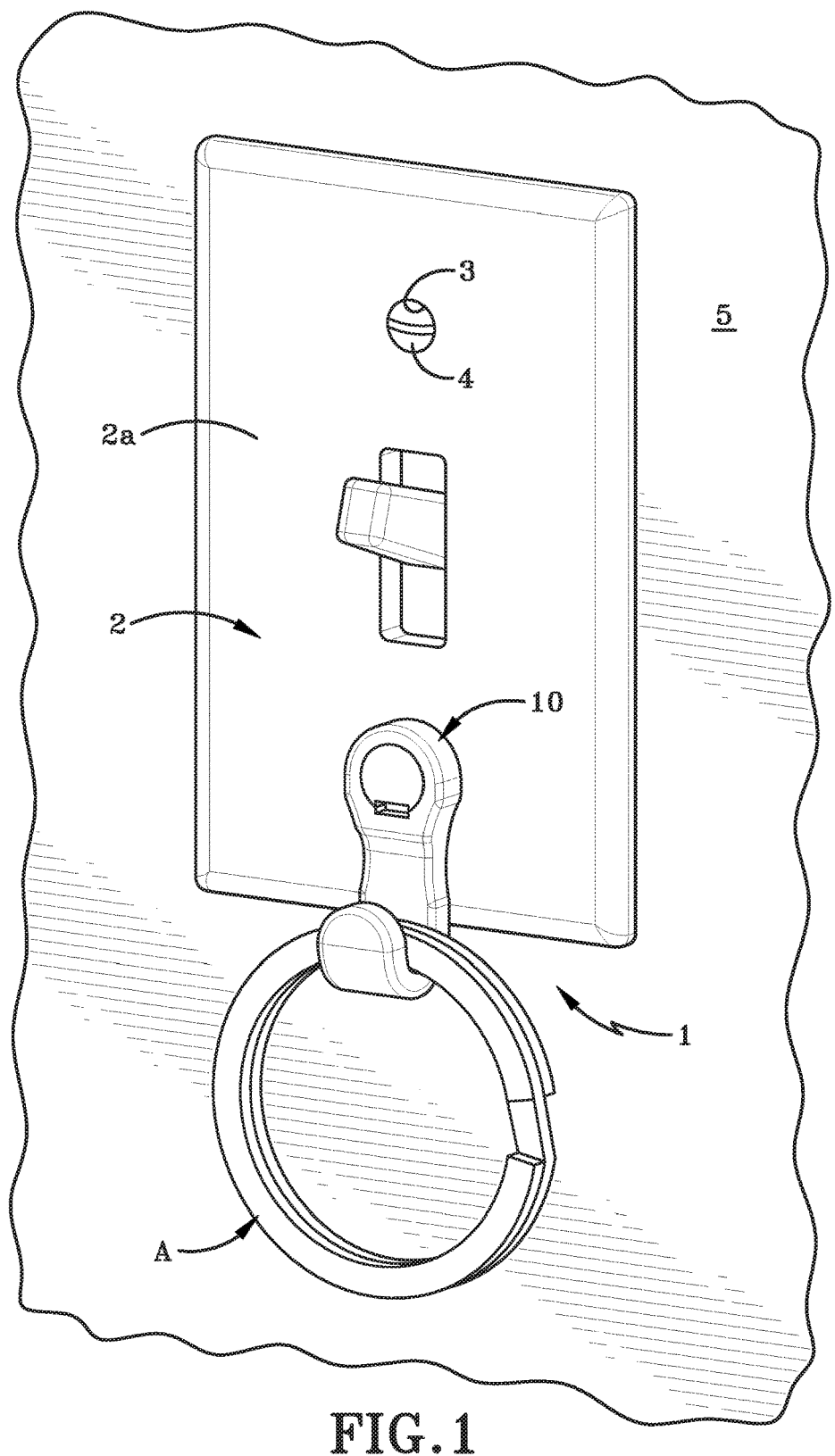
FIG. 1 is a perspective view of a first embodiment of a light switch hook assembly in accordance with the present disclosure and showing an article hanging on a hook of the light switch hook assembly.

The present disclosure relates to a light switch hook assembly 1 that includes a light switch plate 2 and a hook 10. Light switch plate 2 may define a hole 3 therein that extends from a front surface of light switch plate 2 through to a back surface thereof. Hole 3 is located in such a position as to receive a fastener 4 therethrough. Fastener 4 may be inserted through hole 3 in order to secure light switch plate 2 to an electrical connection box (not shown) mounted inside a wall 5. (Wall 5 may comprise any vertical surface to which light switch plate 2 may be secured.) Fastener 4 may be inserted through hole 3 and into an aligned opening (not shown) defined in the electrical box in order to secure light switch plate 2 to the electrical box. If the light switch hook assembly 1 includes a pre-existing light switch plate then the fastener 4 may be removed from hole 3 of the pre-existing light switch plate 2, the hook 10 may be aligned with hole 3, and the fastener 4 may be inserted through an aperture in hook 10 and subsequently into hole 3 and the aligned opening in the electrical box.

Figure 2:
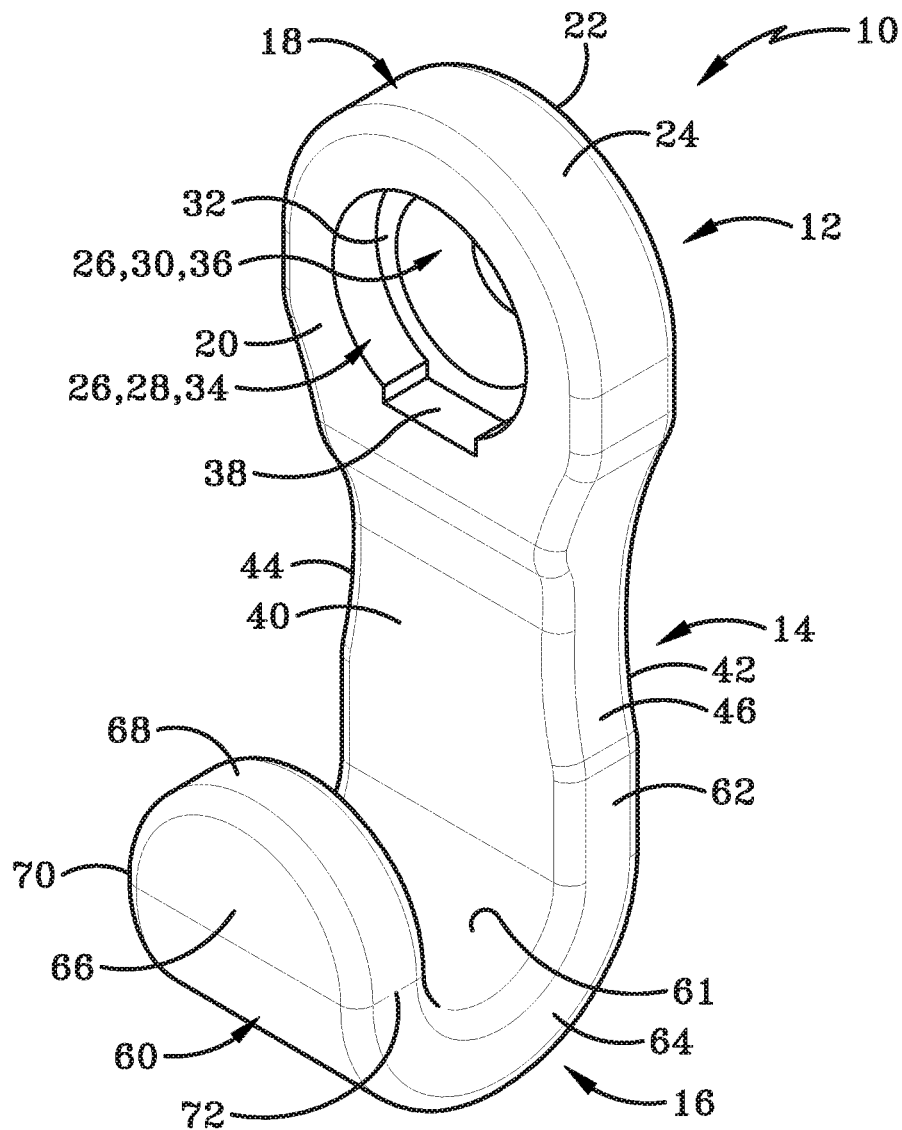
FIG. 2 is a top perspective view of the hook of the light switch hook assembly shown on its own and with its cover removed.
Figure 3:
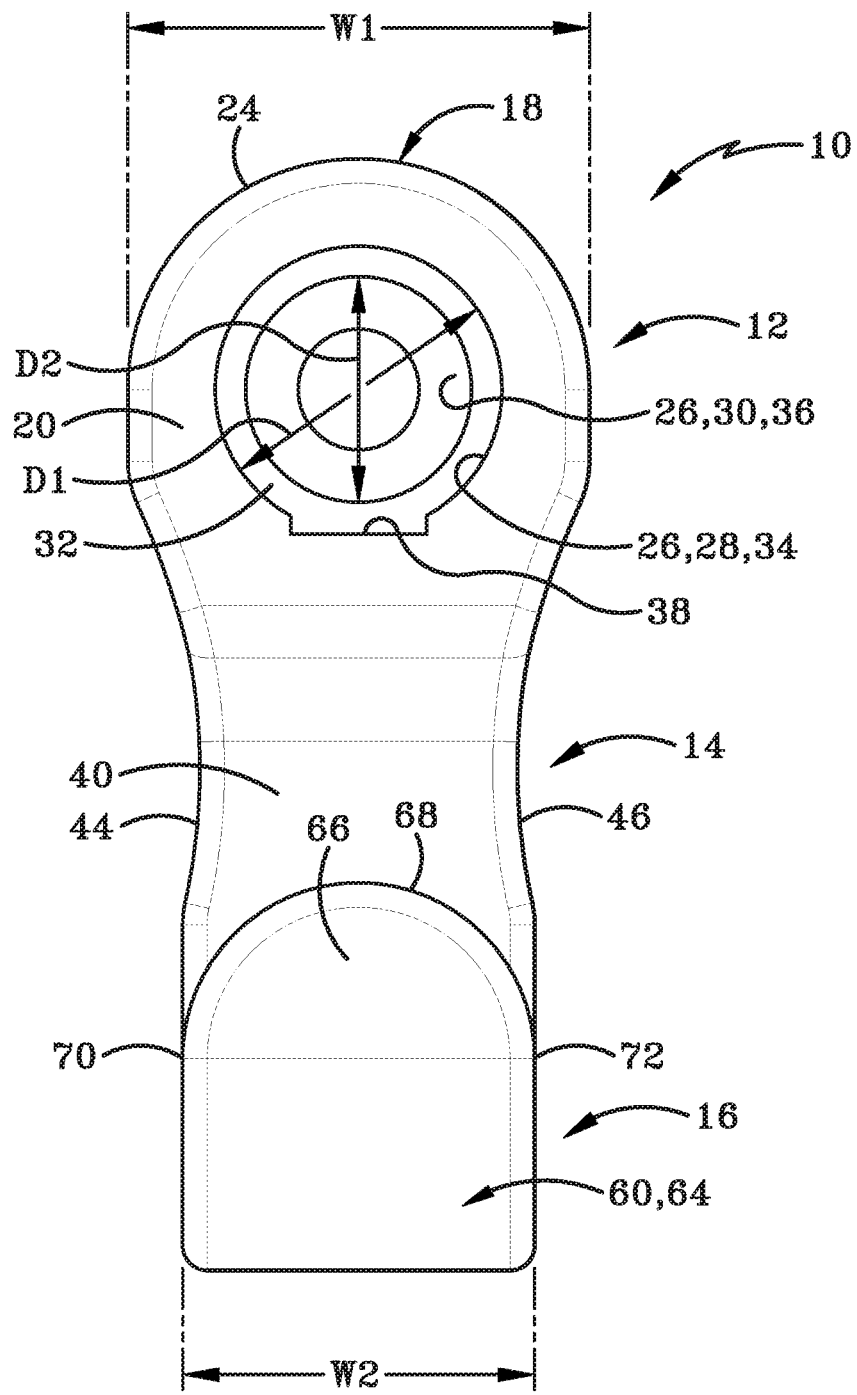
FIG. 3 is a front elevation view of the hook of the light switch hook assembly.
Figure 4:
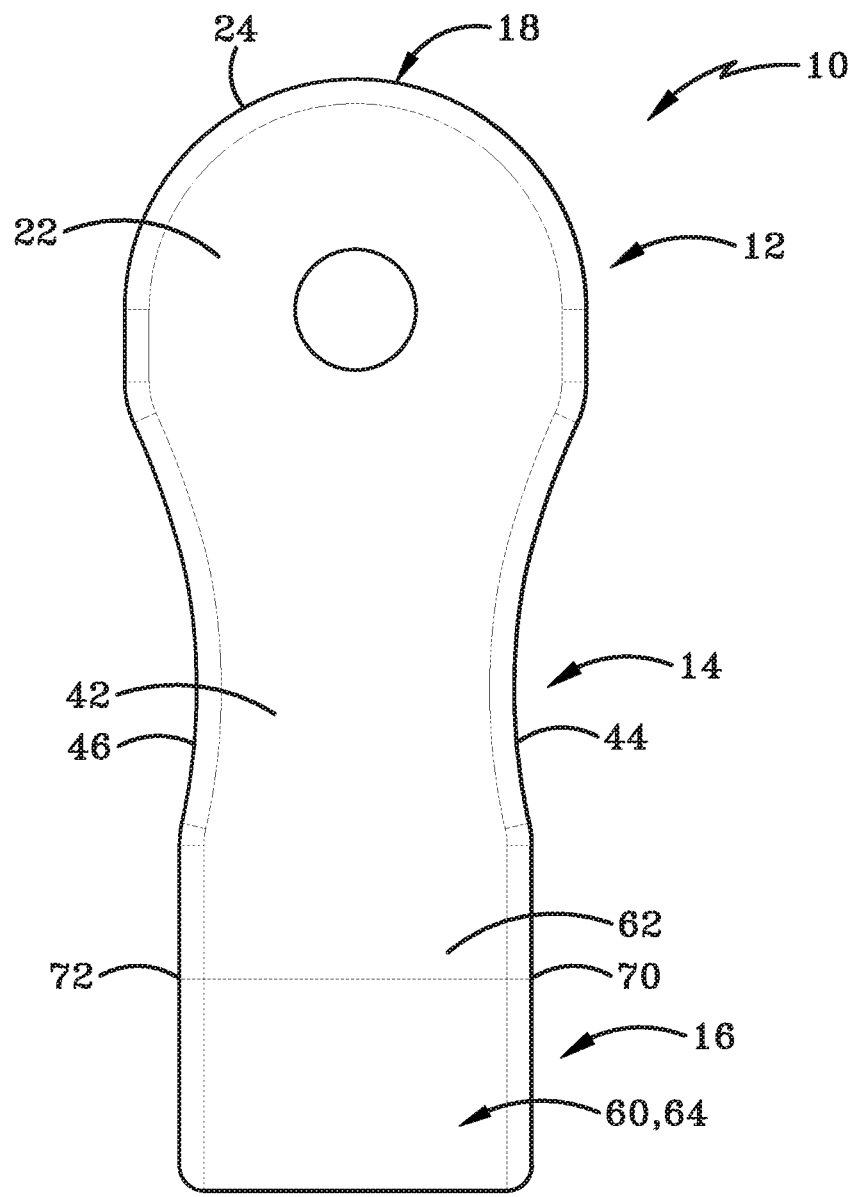
FIG. 4 is a rear elevation view of the hook of the light switch hook assembly.

FIGS. 2 to 4 illustrate a hook 10 that may form part of light switch hook assembly 1. Hook 10 may comprise an upper portion 12, a middle portion 14, and a lower portion 16. Upper portion 12 may comprise an annular body 18 having a front surface 20, a rear surface 22, and a circumferential side wall 24 that extends between front surface 20 and rear surface 22. Upper portion 12 may have a width "W1" (FIG. 3) measured from a left side surface through to a right side surface thereof.

Annular body 18 may define an aperture 26 therein. Aperture 26 may extend from front surface 20 to rear surface 22 of annular body 18. Aperture 26 may be of a type that allows for a head of a fastener to be countersunk therein. As such, aperture 26 may comprise a first region 28 and a second region 30. First region 28 and second region 30 may be concentric and in fluid communication. First region 28 may be of a first diameter "D1", and second region 30 may be of a second diameter "D2"; with the first diameter "D1" being greater than the second diameter "D2".

A flange 32 may extend between first region 28 and second region 30. Flange 32 may form a back interior surface of first region 28 and first region 28 may open at a front surface 20 of upper portion 12. Second region 30 may open at a rear surface 22 of upper portion 12. First region 28 is bounded and defined by a first inner wall 34 (FIG. 3) and second region 30 is bounded and defined by a second inner wall 36 (FIG. 3). Flange 32 extends between first inner wall 34 and second inner wall 36. Second inner wall 36 extends upwardly from rear surface 22 to flange 32. First inner wall 34 extends outwardly from flange 32 to front surface 20. First inner wall 34 may include a recess 38 that includes a generally planar section. Fastener 4 (FIG. 6) may include a head 4A and a shaft 4B. Head 4A is shaped and sized to be received in first region 28. Shaft 4B is shaped and sized to be received through second region 30.

As depicted in FIGS. 2 to 5, middle portion 14 of hook 10 extends downwardly from upper portion. Middle portion 14 has a front surface 40, a rear surface 42, a first side wall 44, and a second side wall 46. First side wall 44 and second side wall 46 may be substantially continuous with circumferential side wall 24 of upper portion 12. First side wall 44 and the second side wall 46 of middle portion 14 may be concave.

Figure 5:
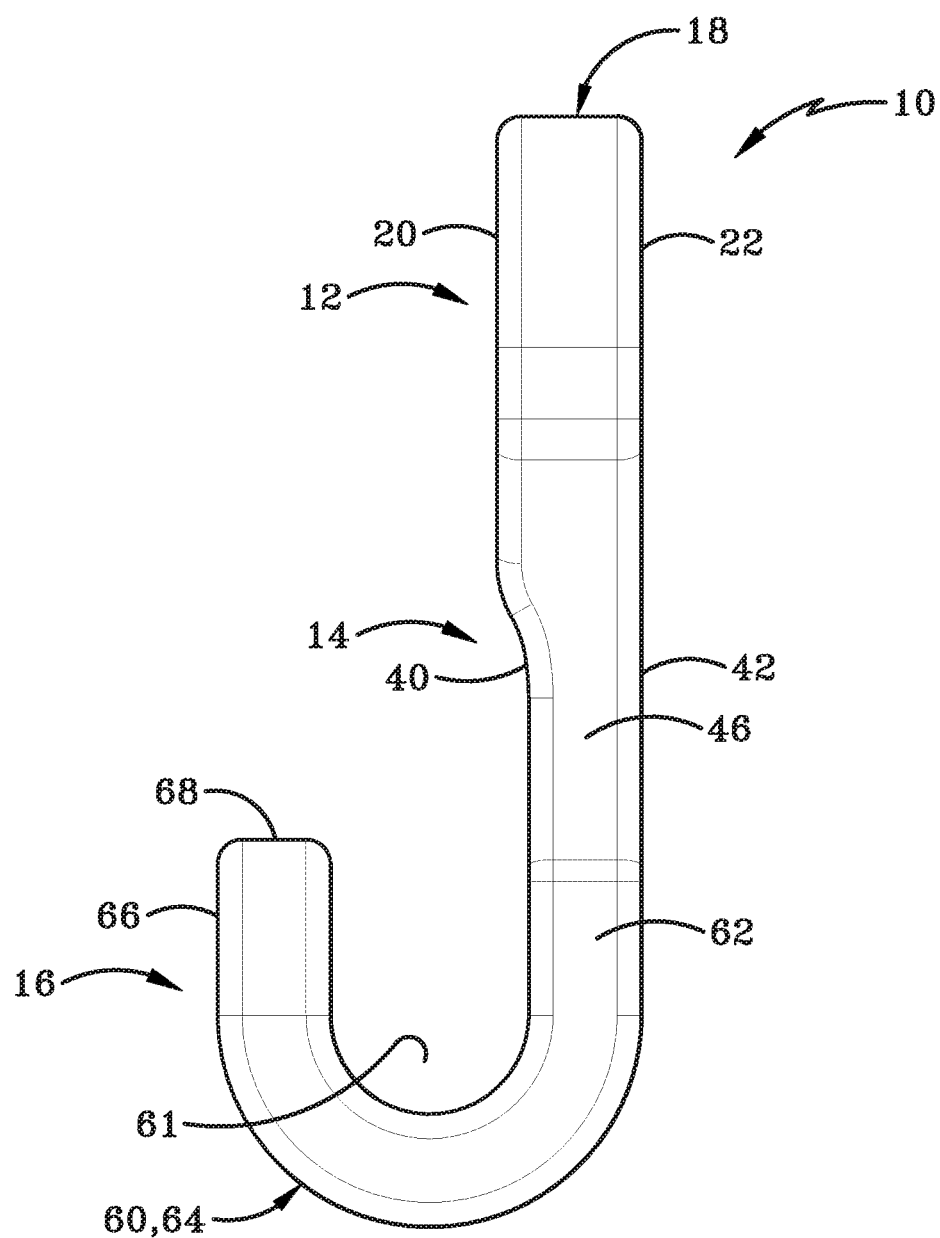
FIG. 5 is a right side elevation view of the hook of the light switch hook assembly.

Rear surface 42 of middle portion 14 may be flush with rear surface 22 of upper portion 12. Front surface 40 may be recessed relative to front surface 20 of upper portion 12. This arrangement of upper portion 12 and middle portion 14 is illustrated in FIG. 5.

Lower portion 16 extends outwardly from the middle portion 14. As shown in FIGS. 2 and 5, lower portion 16 may include a U-shaped hook member 60. Hook member 60 may comprise a first straight section 62, a curved section 64, and a second straight section 66. First straight section 62 may extend downwardly and outwardly from middle portion 14. Curved section 64 extends between first straight section 62 and second straight section 66. Second straight section 66 may be spaced a distance forwardly from the first straight section 62 such that a gap 61 is defined between them. Second straight section 66, as shown in FIGS. 2 and 3, may have a tip 68 that is rounded and extends from a first side wall 70 to a second side wall 72 of second straight section 66. First side wall 70 may be substantially continuous with first side wall 44 of middle portion 14. Similarly, second side wall 72 may be substantially continuous with second side wall 46 of middle portion 14. Tip 68 may be substantially continuous with first side wall 70 and second side wall 72.

As shown in FIG. 3, lower portion 16 may be of a width "W2" that is measured from first side wall 70 to second side wall 72. The width "W2" of lower portion 16 may be smaller than the width "W1" of upper portion 12. Middle portion 14 may taper in width between the left side wall 44 and the right side wall 46 relative to the width "W1" of upper portion 12 and to the width W2 of lower portion 16.

Figure 6:
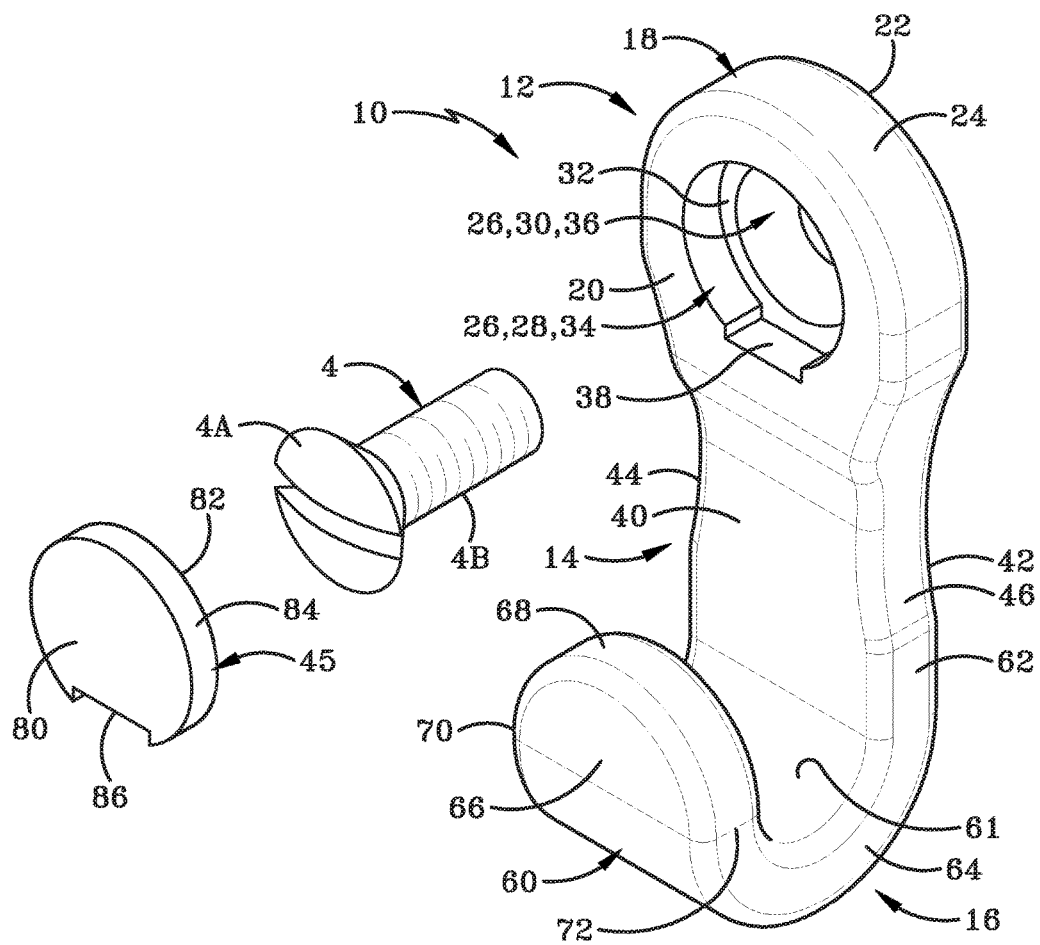
FIG. 6 is an exploded perspective view of the light switch hook assembly.

As depicted in FIG. 6, a cover 45 may be selectively engaged with hook 10. In particular, cover 45 may be positioned to extend across and close off access to aperture 26. Cover 45 may be configured to be substantially similar or identical to the shape of the aperture 26. Cover 45 may comprise a body that includes a front surface 80, a rear surface 82, and an annular side wall 84 that extends between front surface 80 and rear surface 82. Cover 45 and first inner wall 34 may be substantially complementary in shape. As illustrated in the attached figures, that complementary shape may be generally circular. It will be understood, however, that cover 46 and first inner wall 34 may be differently configured, such as being square or hexagonal in shape.

Furthermore, cover 45 may be complementary to the shape of first inner wall 34 except annular side wall 84 may define a depression 86 therein. The depression 86 may be defined in annular side wall 84 in a location that will be placed adjacent recess 38 when cover 45 is engaged with hook 10. When cover 45 is engaged in aperture 26, annular side wall 84 is located adjacent first inner wall 34 and depression 86 and recess 38 will define a space between them. In order to disengage cover 45 from hook 10, a flat-ended tool such as a flat-head screwdriver may be inserted into the space between depression 86 and recess 38 and force may be applied with the screwdriver's tip to remove cover 45 from hook 10.

When cover 45 is engaged in aperture 26, the front surface 80 of cover 45 may be located flush with front surface 20 of upper portion 12.

Figure 7:
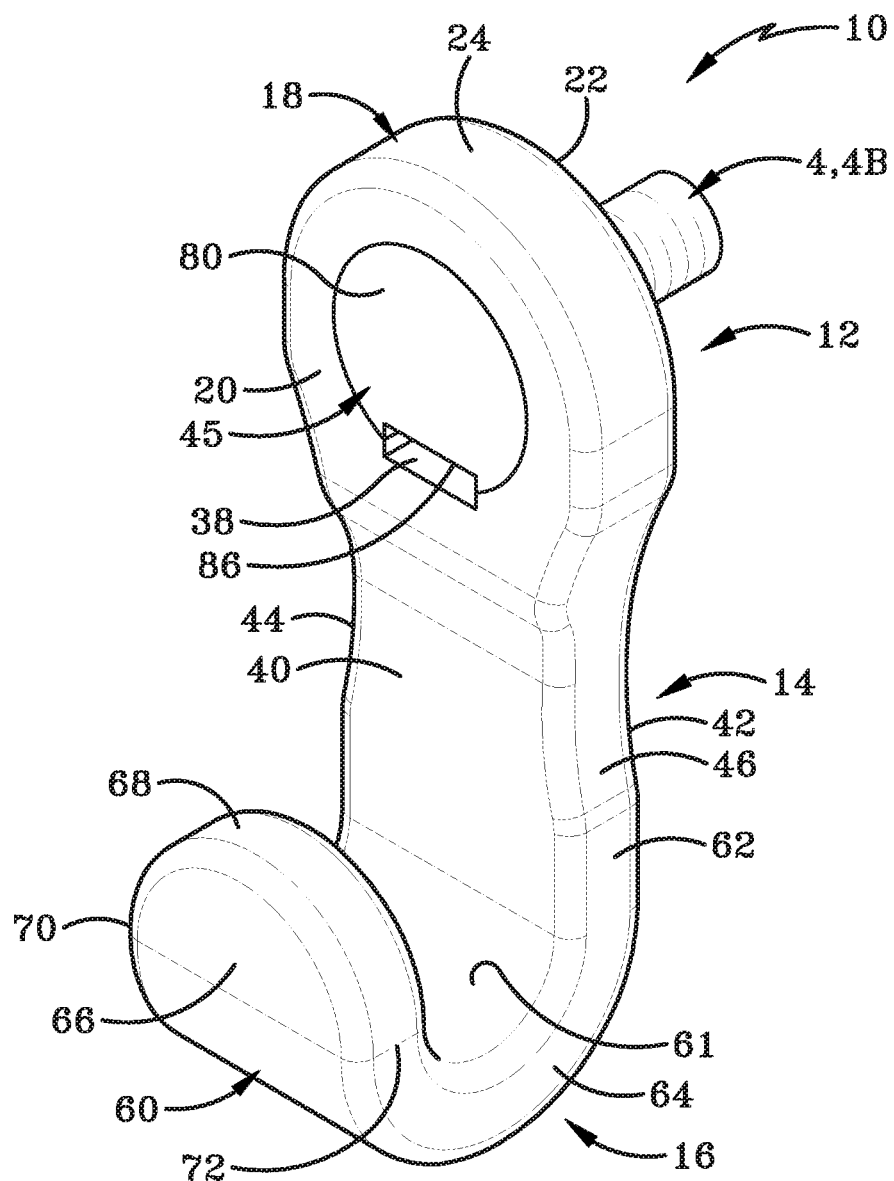
FIG. 7 is a perspective view of the hook with the cover engaged and with the fastener extending out of the back of the hook.
Figure 7A:
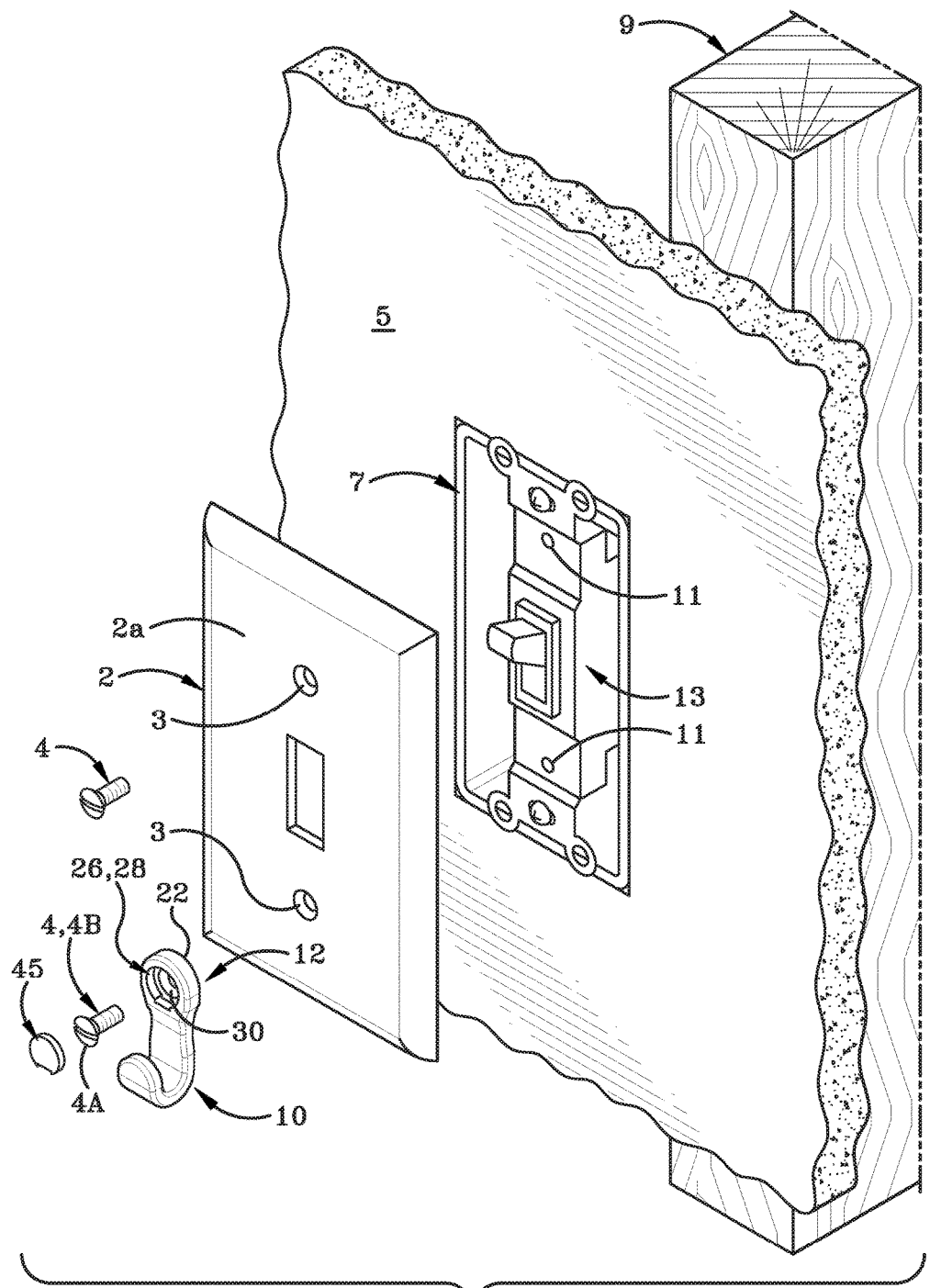
FIG. 7A is an exploded perspective view of the light switch hook assembly of the present disclosure shown exploded away from a light switch mounted in an electrical box that is secured to a wall stud.
Figure 8:
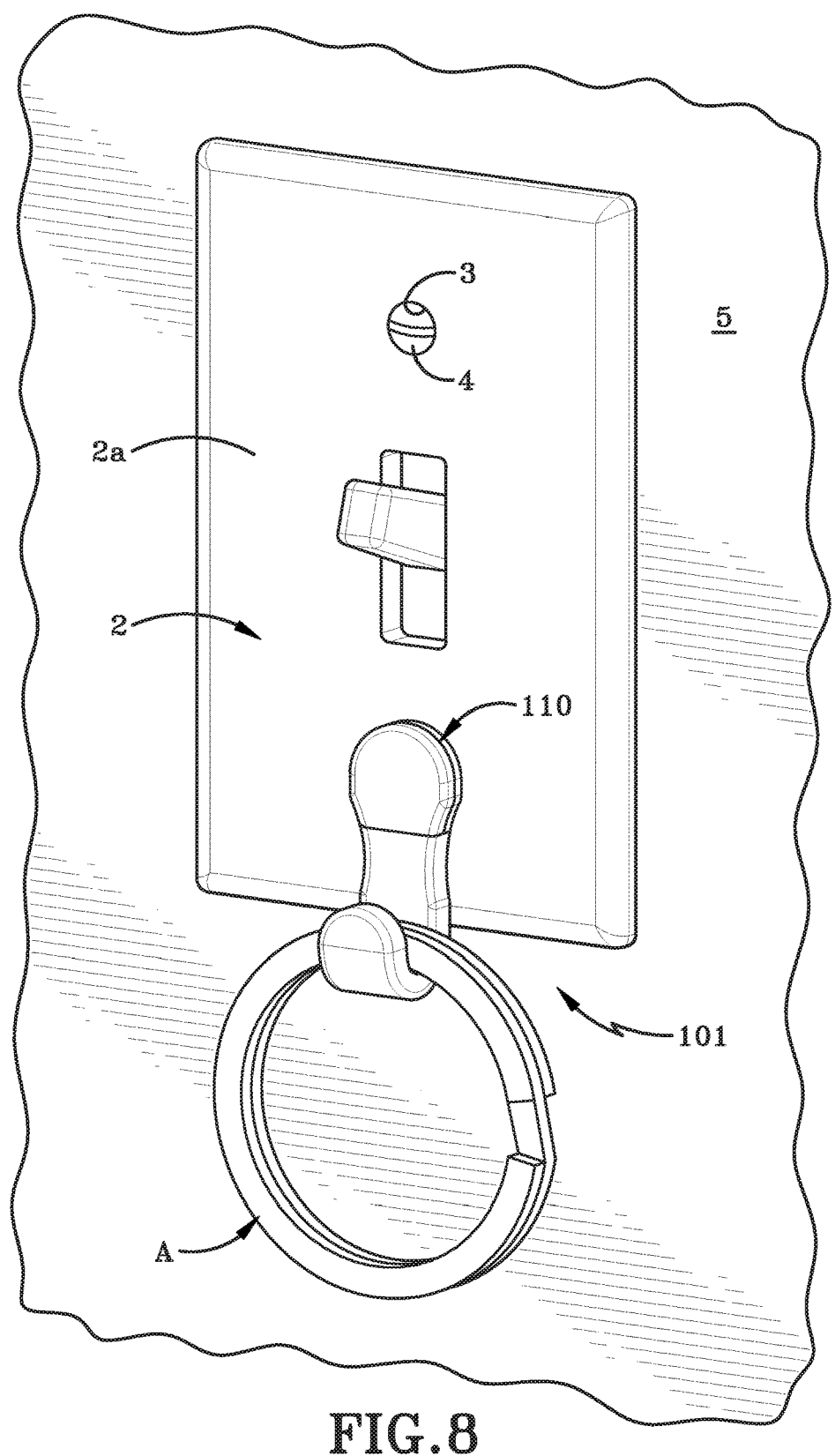
FIG. 8 is a perspective view of a second embodiment of a light switch hook assembly in accordance with the present disclosure and showing an article hanging on a hook of the light switch hook assembly.

FIG. 1 shows light switch hook assembly 1 mounted on a wall 5 and an article "A" engaged on the hook 10. FIG. 7A shows a hook 10 with a cover 45 exploded away therefrom; a light switch plate 2, and an electrical box 7 secured to a stud 9. A pair of openings 11 are illustrated as being provided as part of a light switch 13 located within electrical box 7. Typically, when light switch plate 2 is engaged with electrical box 7, the holes 3 in light switch plate 2 are aligned with the openings 11 in light switch 13, and fasteners 4 are inserted through the aligned holes and openings 3, 11 to secure light switch plate 2 in place.

In order to engage hook 10 with a pre-existing light switch plate 2 (i.e., a light switch plate 2 that was previously secured to light switch 13 in electrical box 7 with fasteners 4, a first step in the installation requires the removal of one of the fasteners 4 from the aligned hole 3 and opening 11 in light switch plate 2 and light switch 13. Preferably, and because an article is to be hung on the hook 10, a lowermost one of the fasteners 4 is removed from its engagement with light switch plate 2 and the associated light switch 13.

Hook 10 is then positioned against light switch plate 2 by placing rear surface 22 of upper portion 12 in abutting contact with front surface 2a of light switch plate 2. The second region 30 of aperture 26 is aligned with the hole 3 in light switch plate 2. Shaft 4B of fastener 4 is inserted through the aligned second region 30 of aperture 26 and hole 3 and into the associated opening 11 in light switch 13. The fastener 4 is rotated until head 4A thereof is seated within first region 28 of aperture 26 of hook 10. At this point, light switch plate 2 and hook 10 are secured to each other and are furthermore simultaneously secured to light switch 13 located within electrical box 7. The head 4A of fastener 4 may be seated into the first region 28 of aperture 26

The fastener cover 45 is then engaged with first inner wall 34 of hook 10 to cover up the head 4A of fastener 4 that is seated within first region 28 of hook. The cover 45 prevents head 4A from being seen or accessed and also gives light switch hook assembly 1 a more aesthetically appealing appearance. When cover 45 is installed on light switch plate 2, the front wall 80 of cover 45 may be flush with front surface 20 of upper portion 12 of hook 10. FIG. 7 shows that when a fastener 4 is engaged with hook 10, a portion of the shaft 4B of the fastener 4 extends a distance beyond the rear surface 22 of upper portion 12 of hook 10. This portion of shaft 4B is received within the opening 11 defined in light switch 13. Once hook 10 is securely engaged with light switch plate 2 and with light switch 13 in electrical box 7, an article "A" may be hung on lower portion 16 of hook 10. This is illustrated in FIG. 1.

If a user wishes to later remove hook 10 from light switch plate 2, cover 45 is removed by inserting a flat object such as a screwdriver into the space between the depression 86 defined in cover and the recess 38 defined in upper portion 12, as has been previously described herein. Removal of cover 45 provides access to head 4A of fastener 4. Fastener 4 may then be disengaged from the light switch 13 and light switch plate 2. Hook 10 is then disengaged from fastener 4 and fastener 4 may then be re-inserted into hole 3 of light switch plate 2 and into the associated opening 11 of light switch 13.

FIGS. 8 to 13 show a second embodiment of the light switch hook assembly, which is generally indicated at 101. The assembly 101 comprises a light switch plate 2 as previously described and a second embodiment of a hook 110. Hook 110 is substantially identical to hook 10 except for differences set out hereafter. The hook 110 comprises an upper portion 112, a middle portion 114, and lower portion 116. The upper portion 112 has a front surface 120 and a rear surface 122. An annular flange 123 extends outwardly from the front surface 120.

An aperture 126 is defined in upper portion 112 of hook 110 and is partially defined by annular flange 123 and partially by a region located between front surface 120 and rear surface 122. The aperture 126 comprises a first region 128 and a second region 130. An opening to the first region 128 is bounded and defined by the annular flange 123. An opening to the second region 130 is defined by the rear surface 122. A fastener 4 is selectively receivable into the aperture 126 such that a head 4A of fastener 4 is seated in the first region 128 and a shaft 4B of fastener 4 may extend through the opening in the second region 130, and outwardly for a distance beyond the rear surface 122.

Figure 9:
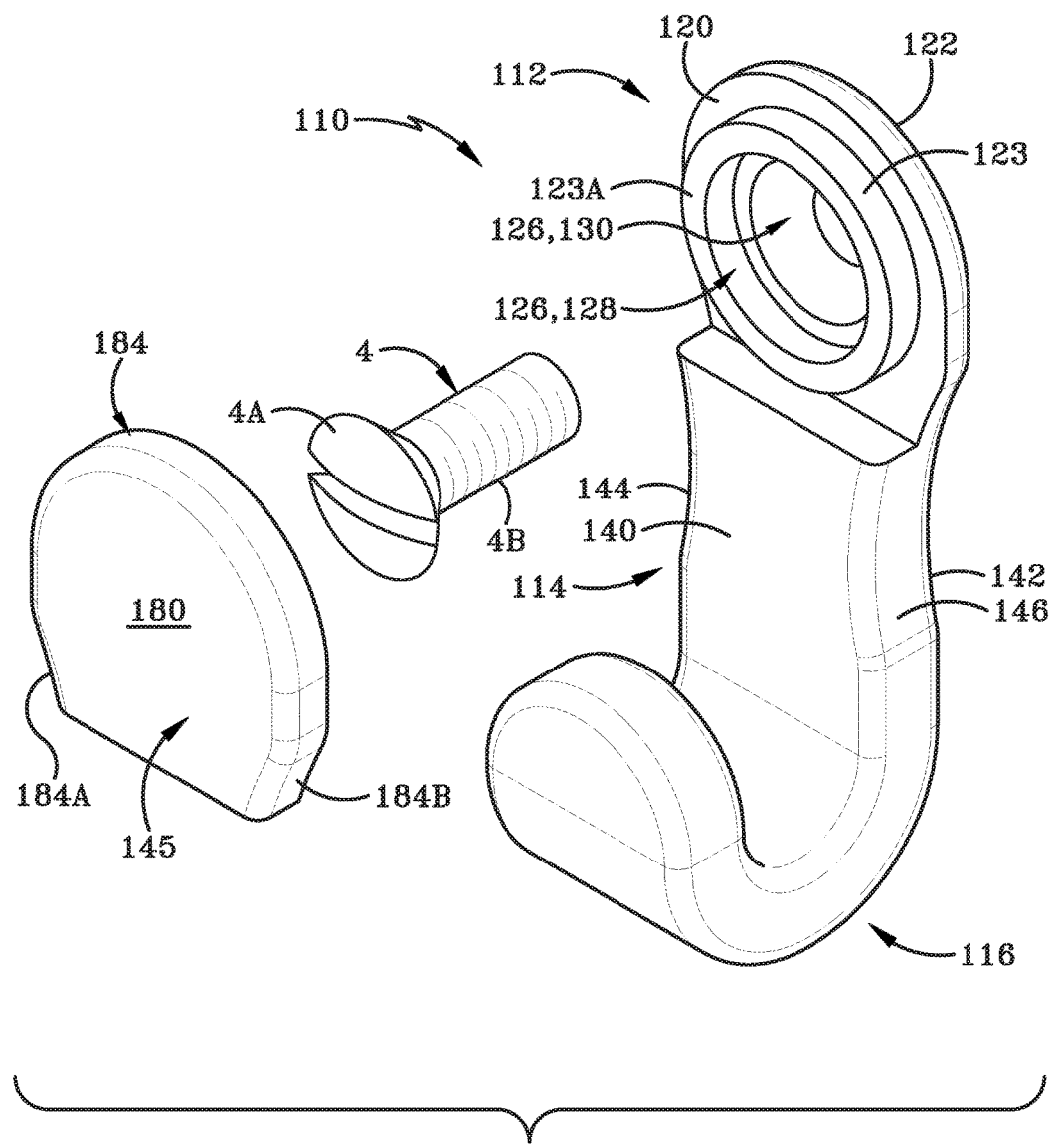
FIG. 9 is an exploded view of the hook and the fastener of the light switch hook assembly of FIG. 8.
Figure 10:
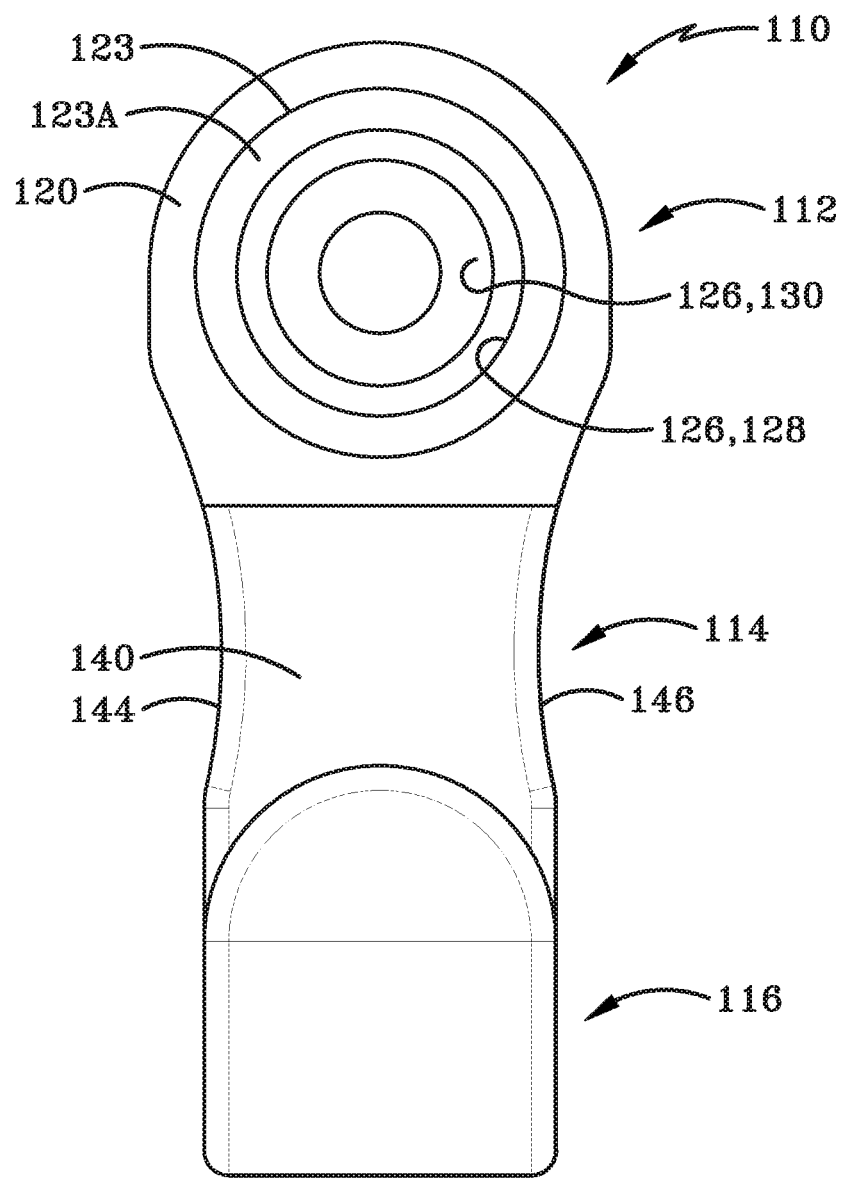
FIG. 10 is a front elevation view of the hook with its cover removed.
Figure 11:
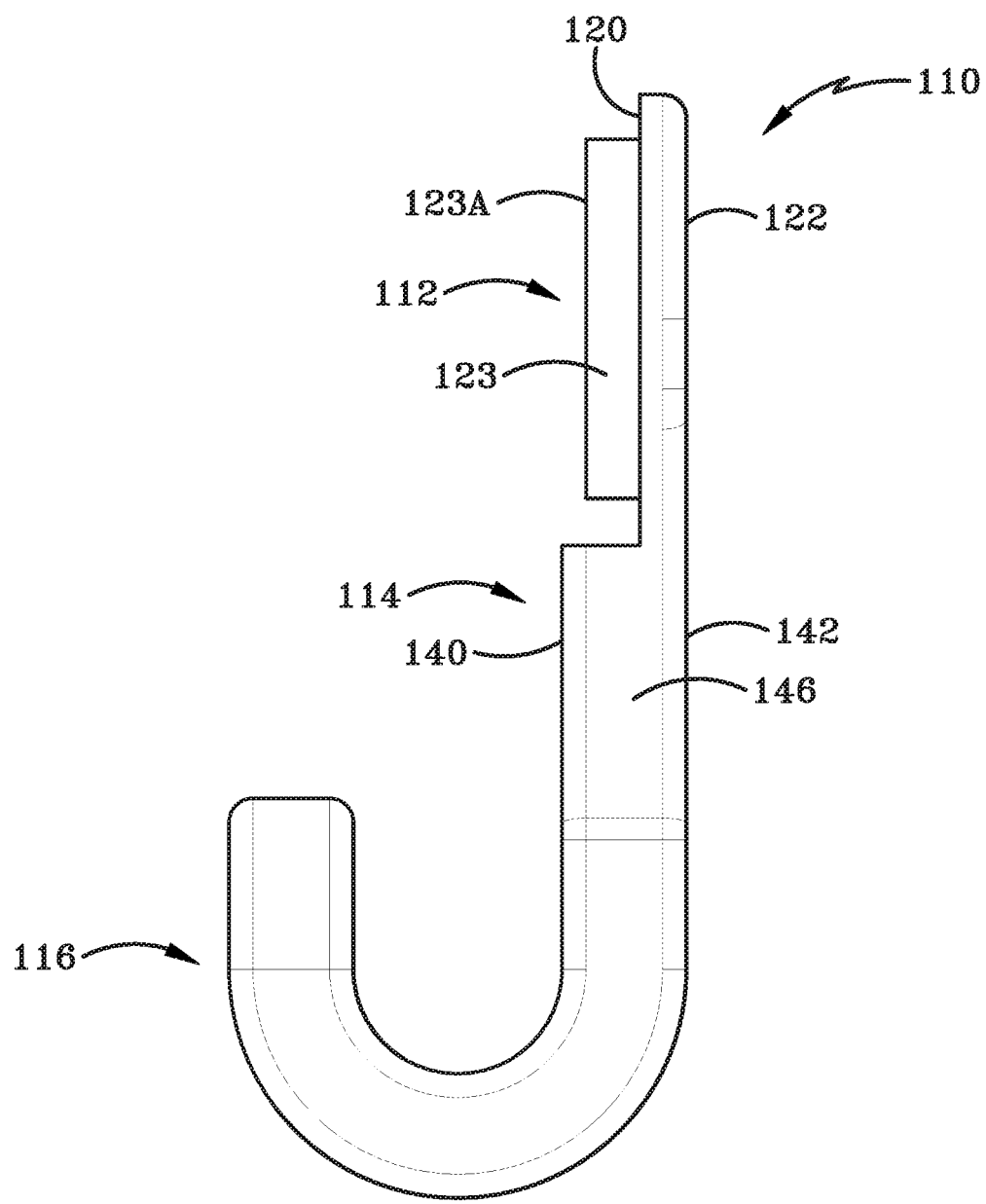
FIG. 11 is a right side elevation view of the hook of FIG. 10.
Figure 12:
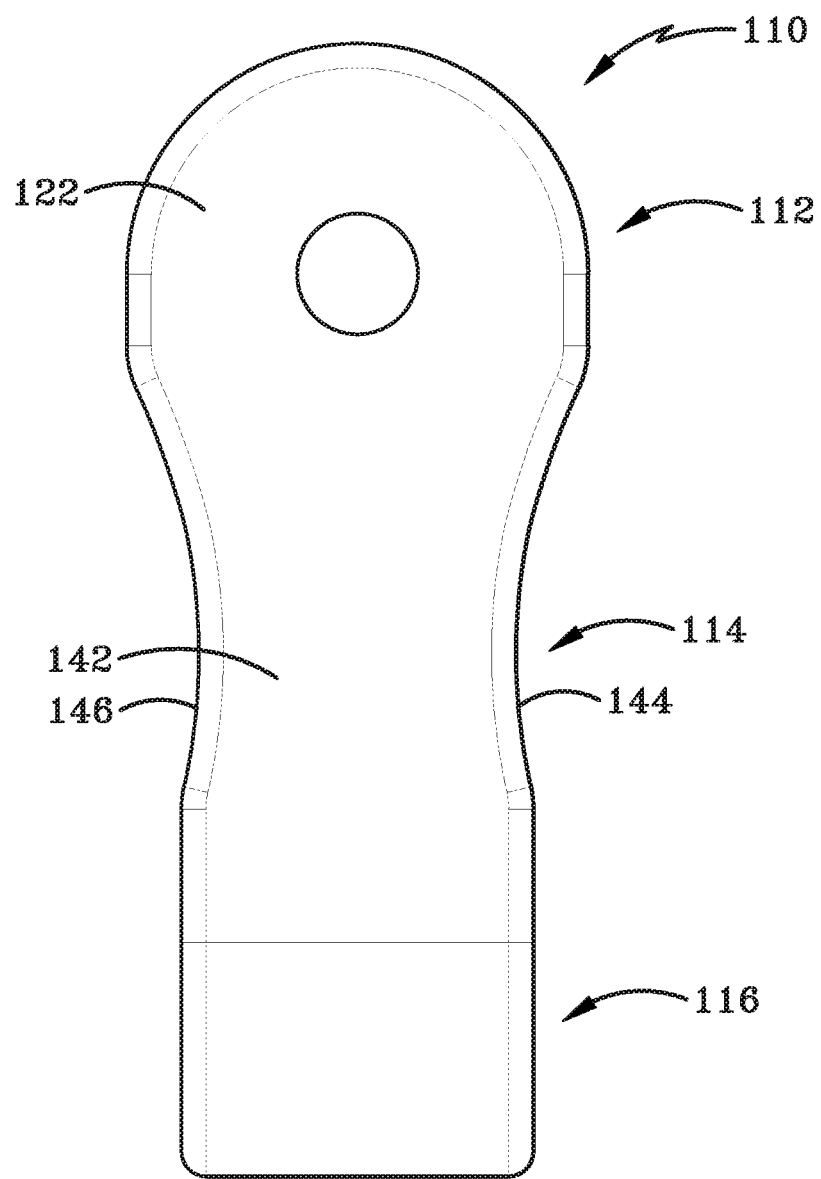
FIG. 12 is a rear elevation view of the hook of FIG. 10.
Figure 13:
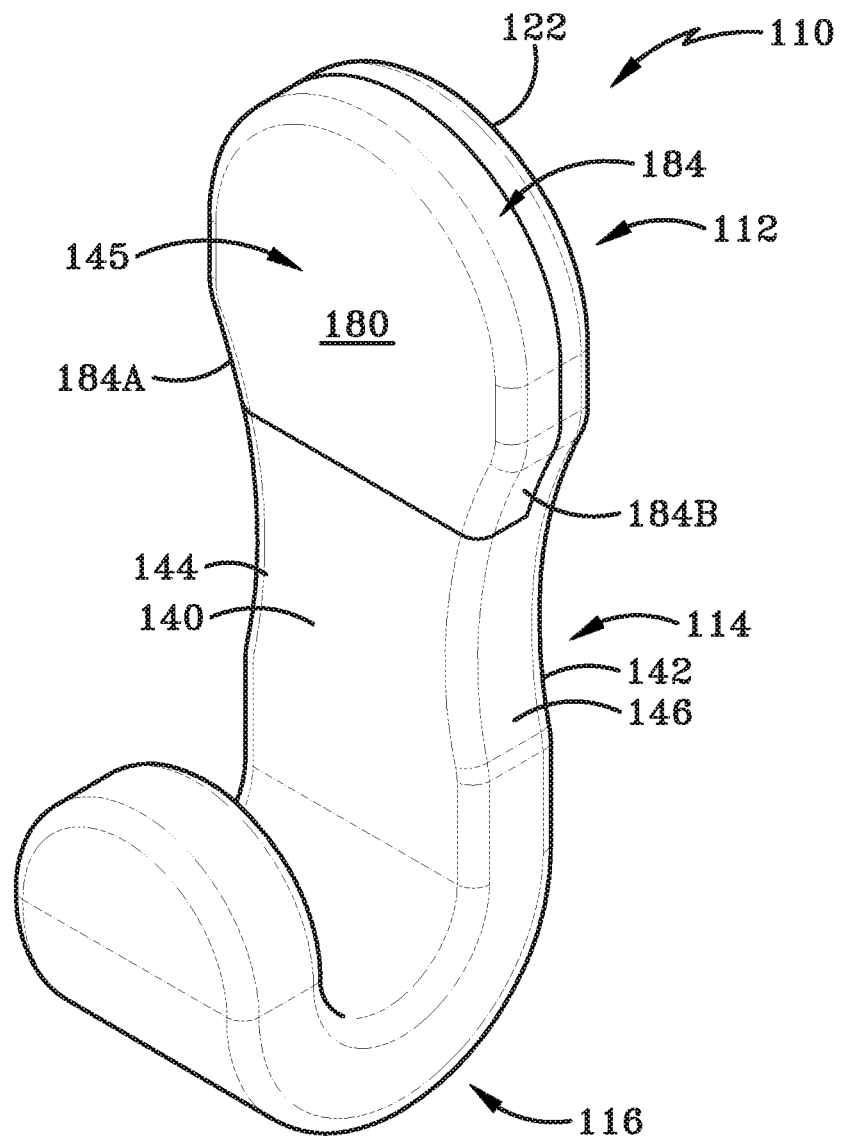
FIG. 13 is a top perspective view of the hook shown with the cover attached.

As can be seen in FIG. 9, the middle portion 114 of hook 110 has a front surface 140, a rear surface 142, a first side 146, and a second side 148. The front surface 120 of the upper portion 112 is recessed relative to the front surface 140 of the middle portion 114 (FIG. 11). The outer edge 123A of the flange 123 is also recessed relative to the front surface 140. The lower portion 116 extends outwardly from the middle portion 114. The lower portion 116 is substantially identical in structure and function to lower portion 16 of hook 10, and therefore will not be described further herein. As shown in FIG. 12, the middle portion 114 of hook 110 may taper in width relative to each of the upper portion 112 and the lower portion 116. The side walls 144, 146 may be concavely configured in a fashion similar to middle portion 14 of hook 10.

The light switch hook assembly 101 differs from the hook assembly 1 in that the shape of hole 126 is different to hole 26 in that no recess 38 is provided. A cover 145 is provided to cover over hole 126 but the cover is not designed to snap-fit into the hole 126 in the manner that cover 45 snap-fits into hole 26. Instead, cover 145 is configured to snap-fit around an exterior region of upper portion 112. Cover 145 may comprise a body having a front surface 180 and a circumferential wall 184 that extends rearwardly from the perimeter of front surface 180. The interior surfaces of front surface 180 and wall 184 defines a recess (not shown) that receives part of the upper portion 112 therein. The cover 145 is designed to be snap-fitted over that part of the upper portion 112. When the cover 145 is engaged with the upper portion 112, a first side 184A of the cover 145 may be flush with the first side wall 144 of the middle portion 114 and a second side 184B of the cover may be is flush with the second side wall 146 of the middle portion 114. The flange 123 of the upper portion 112 may be received in the recessed region of the cover 145.

While the configuration of upper portion 112 and cover 145 of hook 110 differs from upper portion 12 and cover 45 of hook 10, the hook 110 is secured to light switch plate 2 in substantially an identical manner as hook 10 except for the way in which cover 145 is engaged to cover the head 4A of fastener 4.

It is understood that the fastener 4 disclosed in the current disclosure can be a screw, a pin, a pin-screw, or any other similar products which may be used to connect hook 10 to light switch plate 2 so that hook 10 may not be detached from light switch plate 2 while supporting article "A" thereon.

Furthermore, while specifically shaped covers 45 and 145 have been disclosed herein, it will be understood that any type of cover may be engaged with hook 10 or hook 110. The shape of the cover and the manner in which the cover engages hooks 10 or 110 should not be considered to be limited to the particular embodiments shown herein.

It will be understood that in other examples, the hook 10 may be integrally formed with light switch plate 2 or the hook 110 may be integrally formed with light switch plate 2 in such a manner that the hook and light switch plate form a single unitary component. An aperture may be defined in both of the hook and the light switch plate or only in the light switch plate, and a fastener may be inserted through that aperture and into a standard opening defined in a light switch mounted in an electrical connection box. (The standard opening being the one that typically will receive a fastener for securing any light switch plate to the light switch.) The hook will extend outwardly from the front surface of the light switch plate and articles, such as item "A" may be hung therefrom.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A light switch hook assembly comprising:
   a light switch plate having a front surface and a rear surface, said light switch plate being adapted to be secured to a light switch;
   a hook extending outwardly from the front surface of the plate; and
   a fastener that extends through an aperture defined in one of the hook and the light switch plate, wherein said fastener is adapted to be engaged with the light switch; and wherein the aperture is defined in the hook and the aperture includes a first region of a first diameter and a second region of a second diameter, wherein the first region opens at a front surface of the hook and the second region opens at a rear surface of the hook.

2. The light switch hook assembly as defined in claim 1, wherein the aperture is defined in the hook and a hole is defined in the light switch plate; and a shaft of the fastener is inserted through the aperture and the hole when aligned with each other.

3. The light switch hook assembly of claim 1, wherein the first region of the aperture and the second region of the aperture are concentric.

4. The light switch hook assembly of claim 1, wherein the fastener has a head and a shaft, wherein the head is configured to be received in the first region of the aperture, and the shaft is configured to be received through the second region of the aperture.

5. The light switch hook assembly of claim 1, wherein the hook comprises:
an upper portion that defines the aperture therein;
a middle portion extending downwardly from the upper portion, and
a lower portion extending outwardly from the middle portion, wherein the lower portion includes a U-shaped hook member.

6. The light switch hook assembly of claim 5, wherein the hook has a first side wall and a second side wall, and wherein the middle portion tapers in width between the first side wall and the second side wall relative to a width of the upper portion or a width of the lower portion.

7. A light switch hook assembly comprising:
a light switch plate having a front surface and a rear surface, said light switch plate being adapted to be secured to a light switch;
a hook extending outwardly from the front surface of the plate;
a fastener that extends through an aperture defined in one of the hook and the light switch plate, wherein said fastener is adapted to be engaged with the light switch; and
a cover engageable with a portion of the hook, wherein said cover extending across a head of the fastener.

8. The light switch hook assembly of claim 7, wherein the cover is received within a portion of the aperture.

9. The light switch hook assembly of claim 7, wherein the cover is snap-fittingly received over a region of the hook that defines the aperture.

10. The light switch hook assembly of claim 9, further comprising a flange that extends outwardly from the front surface of the hook, wherein a portion of the aperture is bounded and defined at least partially by the flange, and wherein the cover snap-fits over the flange.

11. A method of hanging an article on a wall comprising steps of:
providing a light switch plate having a hole defined therein, wherein the hole extends between a front surface and a back surface of the light switch plate;
placing a rear surface of a hook against the front surface of the light switch plate;
extending the hook outwardly from the front surface;
aligning an aperture defined in the hook with the hole defined in the light switch plate;
inserting a shaft of a fastener through the aligned aperture and hole;
inserting the shaft of the fastener into an opening defined in a light switch mounted within an electrical connection box;
inserting the shaft of the fastener into an opening defined in a light switch mounted within an electrical connection box; and
rotating the fastener until the light switch plate and hook are secured to the light switch.

12. The method as defined in claim 11, further comprising:
hanging an article on the hook.

13. The method as defined in claim 11, further comprising:
seating a head of the fastener in a recessed region of the hook; and
covering the recessed region with a cover.

14. The method as defined in claim 13, wherein the step of covering includes one of placing the cover into a first region of the aperture defined in the hook and snap-fitting the cover over a part of the hook that includes the aperture.

15. The method as defined in claim 11, wherein the step of aligning the aperture with the hole is preceded by a step of disengaging a cover from the hook.

16. The method as defined in claim 15, wherein the step of disengaging the cover is accomplished by:
inserting an end of a tool into a recess defined in a perimeter of the aperture or in a perimeter of the cover and applying a force to the cover with the end of the tool.

17. A method of mounting a hook on a vertical surface comprising steps of:
unscrewing a fastener from a light switch plate installed the vertical surface;
removing the fastener from a hole defined in the light switch plate;
providing the hook having an aperture defined therein;
placing the hook against the light switch plate;
aligning the aperture defined in the hook with the hole;
inserting the fastener through the aligned aperture and hole;
securing the hook to the light switch plate;
engaging a cover with the hook; and
covering a head of the fastener with the cover.

18. The method as defined in claim 17, further comprising:
inserting an end of the fastener into an opening defined in a light switch mounted in an electric connection box; and
sandwiching the light switch plate between the hook and the light switch.

* * * * *